(12) United States Patent
Song et al.

(10) Patent No.: US 7,566,510 B2
(45) Date of Patent: Jul. 28, 2009

(54) SEALING ELEMENT FOR ANODE-SUPPORTED TUBULAR SOLID OXIDE FUEL CELL AND SEALING METHOD USING THE SAME

(75) Inventors: Rak-Hyun Song, Taejon (KR); Dong-Ryul Shin, Taejon (KR); Tak-Hyun Lim, Taejon (KR); Jong-Hee Kim, Taejon (KR); Dong-You Chung, Seoul (KR); Huy-Jeong Son, Choongnam (KR)

(73) Assignee: Korea Institute of Energy Research, Taejon (KR)

( * ) Notice: Subject to any disclaimer, the term of this patent is extended or adjusted under 35 U.S.C. 154(b) by 474 days.

(21) Appl. No.: 11/520,364

(22) Filed: Sep. 13, 2006

(65) Prior Publication Data

US 2007/0231660 A1  Oct. 4, 2007

(30) Foreign Application Priority Data

Apr. 4, 2006  (KR) .................. 10-2006-0030361

(51) Int. Cl.
*H01M 8/10* (2006.01)
*H01M 2/08* (2006.01)
*B05D 5/12* (2006.01)

(52) U.S. Cl. .................. 429/31; 429/35; 427/115

(58) Field of Classification Search .................. 429/31, 429/35; 427/115
See application file for complete search history.

(56) References Cited

FOREIGN PATENT DOCUMENTS

| JP | 10-189015 | * | 7/1998 |
| JP | 2002-289249 | | 10/2002 |

* cited by examiner

*Primary Examiner*—Patrick Ryan
*Assistant Examiner*—Thomas H. Parsons
(74) *Attorney, Agent, or Firm*—DeLio & Peterson, LLC; Peter W. Peterson

(57) ABSTRACT

A sealing element and a sealing method for sealing both ends of an anode-supported tubular solid oxide fuel cell. The sealing element utilizes a coupling tube having one end opened to an exterior and a second end with a perforation hole, in which the coupling tube is formed with an internal cavity having a shape corresponding to an external appearance of an end portion of a fuel cell. A flow tube having a hollow section axially extends outwards from the second end of the coupling tube while communicating with the perforation hole. The sealing method involves cleaning the sealing element and fuel cell, surrounding an outer peripheral surface of an electrolyte layer on the ends of the fuel cell with a metallic filler material, inserting the fuel cell in a connection tube of the sealing element, heating and melting the filler material, and solidifying the melted filler material.

9 Claims, 8 Drawing Sheets

SEALING ELEMENT FOR ANODE-SUPPORTED TUBULAR SOLID OXIDE FUEL CELL AND SEALING METHOD USING THE SAME

BACKGROUND OF THE INVENTION

1. Field of the Invention

The present invention relates to a cap type metallic sealing element, which is coupled to both ends of an anode-supported tubular solid oxide fuel cell having various sectional shapes, such as a cylindrical shape or a flat tubular shape, so as to easily and precisely seal the both ends of the anode-supported tubular solid oxide fuel cell such that the anode-supported tubular solid oxide fuel cell can efficiently collect electric charges, and a method for sealing both ends of an anode-supported tubular solid oxide fuel cell by coupling a cap type metallic sealing element to the both ends of the anode-supported tubular solid oxide fuel cell by means of brazing.

2. Description of the Prior Art

A fuel cell technology is a highly efficient clean power generation technology capable of directly converting hydrogen contained in hydrocarbon based materials, such as natural gas, coal gas or methanol, and oxygen contained in air into electric energy through an electrochemical reaction. Fuel cells are mainly classified into alkaline fuel cells, phosphoric acid fuel cells, molten carbonate fuel cells, solid oxide fuel cells and polymer fuel cells according to the type of electrolytes used for the fuel cells.

In general, the fuel cell uses hydrogen gas, which mainly consists of hydrogen and is obtained by reforming fossil fuel, and oxygen contained in air as fuel thereof. The phosphoric acid fuel cell (PAFC) using a phosphoric acid electrolyte is called a "first generation fuel cell", the molten carbonate fuel cell (MCFC) using molten carbonate as an electrolyte thereof and operating at the high temperature of about 650° C. is called a "second generation fuel cell", and the solid oxide fuel cell (SOFC) operating at the temperature higher than that of the MCFC and generating power with the highest efficiency is called a "third generation fuel cell".

Although the SOFC called a "third generation fuel cell" has been developed after the PAFC and the MCFC, since the technology has rapidly advanced, the SOFC is expected to be used in practice very soon, together with the PAFC and the MCFC. To this end, many advanced countries concentrate efforts on the research and development of the SOFC technology.

The SOFC operates at the high temperature in a range of about 600 to 1000° C. In addition, the SOFC represents the highest efficiency from among various conventional fuel cells while minimizing environmental pollution. Also, the SOFC can realize combined power generation without requiring a fuel reformer.

The SOFC is classified into a tubular SOFC and a flat SOFC. A power density in a stack of the tubular SOFC is slightly lower than that of the flat SOFC, but a power density in a system of the tubular SOFC is similar to that of the flat SOFC. However, the tubular SOFC represents superior resistance against thermal stress and unit cells forming the stack of the tubular SOFC can be easily sealed. In addition, the stack of the tubular SOFC has a higher mechanical strength, so that the tubular SOFC can be fabricated in a large size. For this reason, studies and research have been actively performed with respect to the tubular SOFC. The tubular SOFC is again classified into a cathode-supported tubular SOFC using a cathode as a supporter for the fuel cell and an anode-supported tubular SOFC using an anode as a supporter for the fuel cell.

The anode-supported tubular SOFC is more advanced than the cathode-supported tubular SOFC, and studies and research for the tubular SOFC are focused on the anode-supported tubular SOFC.

The anode-supported tubular SOFC has a tubular structure having various sectional shapes, such as a cylindrical shape and a flat tubular shape. As shown in FIG. 1, the anode-supported tubular SOFC 1 or 1' includes an anode 11 or 11', an electrolyte layer 12 or 12' and a cathode 13 or 13', which are sequentially stacked from an inner portion of the anode-supported tubular SOFC 1 or 1'. For the purpose of electrical connection, a connection member 14 is provided on an outer peripheral portion of the anode 11 or 11' such that the connection member 14 may protrude from the outer peripheral portion of the anode 11 or 11' without making contact with the cathode 13 or 13'.

At this time, in the case of the anode-supported flat tubular SOFC 1', since the width of the anode-supported flat tubular SOFC 1' is relatively larger than the height of the anode-supported flat tubular SOFC 1', a plurality of parallel bridges B servicing as supporters are vertically installed between an inner bottom portion and an inner top portion of the anode 11' in order to reinforce the strength of the anode-supported flat tubular SOFC 1'.

In the anode-supported cylindrical SOFC 1 or the anode-supported flat tubular SOFC 1' having the above structure, fuel gas must be fed through a hollow path formed in the anode 11 or 11' while maintaining both ends of a unit cell in a sealed state. To this end, conventionally, a sealing element made of glass or glass ceramic is provided to both ends of the fuel cell so as to seal the both ends of the fuel cell from the exterior.

However, in the case of the anode-supported cylindrical SOFC 1 or the anode-supported flat tubular SOFC 1' having the connection member 14, it is difficult to completely seal the both ends of the fuel cell because of a geometrical sectional shape of the connection member 14. In addition, a sealing portion is very weak against thermal impact.

In order to solve the problem derived from the geometrical sectional shape of the connection member 14, as shown in FIG. 2, a fuel cell 2 or 2' including an anode 11 or 11', an electrolyte layer 22 or 22' and a cathode 23 or 23' has been developed without the connection member 14. However, if the sealing element is coupled to the above fuel cell 2 or 2', the anode cannot directly collect electric charges due to the insulation characteristic of the sealing element.

That is, the electric charges must be collected by means of a collection wire connected to the anode 11 or 11' by passing through the sealing element from the exterior, so that the internal resistance of the fuel cell 2 or 2' may increase, degrading the performance of the fuel cell 2 or 2'.

SUMMARY OF THE INVENTION

Accordingly, the present invention has been made to solve the above-mentioned problems occurring in the prior art, and an object of the present invention is to provide a sealing element and a sealing method using the same, in which the sealing element has a superior thermal shock resistance and can perfectly seal a fuel cell without requiring a collection wire for collecting electric charges, so that the long-term performance and reliability of the fuel cell can be improved and a mass-storage tubular fuel cell stack can be fabricated.

The object of the present invention can be achieved by brazing a cap type metallic sealing element with a fuel cell.

The sealing element used for the anode-supported SOFC has a tubular structure in the form of a metallic cap, into which end portions of a fuel cell surrounded by a metallic filler material are inserted. The sealing element and the tubular fuel cell inserted into the sealing element are coupled with each other through brazing, such that the tubular fuel cell can be sealed by means of the sealing element. That is, the metallic filler material formed on an outer peripheral surface of the tubular fuel cell is melted in such a manner that a gap formed between the sealing element and the tubular fuel cell can be filled with the metallic filler material, and then the metallic filler material is cooled and solidified, thereby sealing the tubular fuel cell.

At this time, the metallic filler material includes a metal paste or a metal sheet.

Prior to explaining the present invention, it should be noted that a term "one side of the sealing element" refers to an inlet side of the sealing element, into which the fuel cell is axially inserted, and a term "the other side of the sealing element" refers to a side of the sealing element, which is located axially opposite the inlet side of the sealing element.

The sealing element has a metallic cap structure and is coupled to both ends of the fuel cell. The sealing element includes a coupling tube having a first end portion opened to an exterior such that an end portion of the fuel cell can be inserted into the first end portion of the coupling tube and a second end portion opened to the exterior only through a perforation hole, which is formed at a center of the second end portion of the coupling tube and has a sectional area equal to or smaller than a sectional area of a gas path formed in the fuel cell, in which the coupling tube is formed at an inner portion thereof with an internal cavity having a shape corresponding to an external appearance of the end portion of the fuel cell inserted into the coupling tube; and a flow tube extending outward from the center of the second end portion of the coupling tube and being formed at an inner portion thereof with a hollow section, which axially extends while communicating with the perforation hole of the coupling tube so as to feed fuel gas or discharge fuel gas after the fuel gas has been used.

That is, the sealing element according to the present invention includes a small-diameter tube and a large-diameter tube, which are integrally formed with each other in the same axial line. In addition, the end portion of the fuel cell is inserted into the coupling tube of the sealing element in such a manner that an electrolyte layer formed at an outer peripheral surface of the end portion of the fuel cell can make contact with an inner peripheral surface of the coupling tube and the anode located at an inner portion of a front end of the fuel cell can make contact with an inner surface of the second end portion of the coupling tube in the vicinity of the perforation hole.

Accordingly, fuel gas is fed into the gas path formed in an inner portion of the anode of the fuel cell, which has been inserted into the coupling tube, by way of the hollow section of the flow tube of the sealing element coupled with one end of the fuel cell and the perforation hole formed at the second end portion of the coupling tube. In addition, when the fuel gas has been used, the fuel gas is discharged to the exterior by way of the gas path of the anode, and the perforation hole and the hollow section formed at the other side of the sealing element.

In addition, in the case of the tubular fuel cell, which is not provided with the connection member, both end portions of the fuel cell inserted into the coupling tube of the sealing element have a dual stack structure consisting of an anode and an electrolyte layer coated on an outer peripheral surface of the anode without an outermost layer (cathode). In the case of the tubular fuel cell, which is provided with the connection member, both end portions of the fuel cell have a dual stack structure consisting of the anode and the electrolyte layer without the connection member as well as the outermost layer (cathode).

However, unlike the both end portions of the tubular fuel cell, the center portion of the tubular fuel cell has a structure identical to that of a normal tubular fuel cell. That is, in a state in which the both end portions of the fuel cell have been inserted into the sealing element, the sealing element is spaced apart from the cathode (outermost layer) such that the sealing element may not make contact with the cathode. If the fuel cell is provided with the connection member, the connection member makes contact with the anode, rather than the cathode, so that there is no harmful effect even if the connection member makes contact with the sealing element. For the purpose of convenience, the following description for the sealing element will be made in relation to the tubular fuel cell, which is not provided with the connection member.

For instance, if the length of the fuel cell is 10 cm and the length of each end portion of the fuel cell is 1 cm when the outermost layer (cathode) is not provided in the fuel cell, the length of the center portion of the fuel cell having the cathode is 8 cm. In this case, the length of an insertion part of each end portion, which is inserted into the sealing element, must be shorter than 1 cm in such a manner that an end portion of the cathode of the fuel cell can be located away from one side of the sealing element to prevent the sealing element from making contact with the cathode.

In addition, the outer peripheral surfaces of the both end portions of the fuel cell, in which each end portion of the fuel cell is inserted into the sealing element through the one side of the sealing element and the electrolyte layer is coated on the peripheral surface of each end portion of the fuel cell, are covered with the metallic filler materials. At this time, the metallic filler materials must not make contact with the cathode.

That is, in the above case, the outer peripheral surface of the fuel cell, which is surrounded by the metallic filler material at each end portion of the fuel cell, must have a length less than 1 cm such that the metallic filler material may not contact with the cathode. In addition, the insertion part of each end portion of the fuel cell, which is inserted into the sealing element, must have a length shorter than that of the outer peripheral surface surrounded by the metallic filler material. In this case, if the end portion of the fuel cell covered with the metallic filler material is inserted into the sealing element, a portion of the metallic filler material, which surrounds the outer peripheral surface of the electrolyte layer at a position adjacent to the center portion of the fuel cell, may be located at a position away from one side of the sealing element, so that the electrolyte layer, which is not surrounded by the metallic filler material, and the cathode are sequentially revealed.

In this manner, since the end portion of the fuel cell is inserted into the sealing element after the end portion of the fuel cell has been surrounded by the metallic filler material, the anode of the fuel cell is electrically connected to the sealing element, but the cathode of the fuel cell is electrically insulated from the sealing element, so that the sealing element has negative polarity (−) and the anode has positive polarity (+).

In addition, the sealing method according to the present invention can be achieved through a brazing process. According to the sealing method of the present invention, the sealing element and the fuel cell are securely sealed through brazing in a state in which the end portion of the fuel cell surrounded by the metallic filler material has been inserted into the sealing element.

Herein, the term "brazing" refers to a process for bonding two objects by melting a filler material having a melting point lower than that of the objects. The filler material flows into a gap formed between two objects due to a capillary phenomenon, and then is solidified, thereby bonding two objects. When the sealing element and the end portion of the fuel inserted into the sealing element are heated, the metallic filler material is melted and the melted metallic filler material is filled in the gap formed between the inner peripheral surface of the sealing element and the outer peripheral surface of the fuel cell. In this state, the melted filler material is cooled and solidified, so that the gap formed between the sealing element and the fuel cell can be perfectly sealed.

Various heating methods can be used during the brazing process. Preferably, high frequency induction heating or vacuum heating is performed under the inert gas atmosphere in order to reduce the heating time while preventing the metal from being oxidized.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1A:
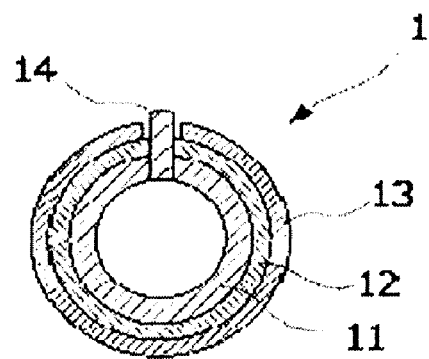
FIG. 1A is a cross sectional view illustrating an anode-supported cylindrical solid oxide fuel cell (SOFC)
Figure 1B:
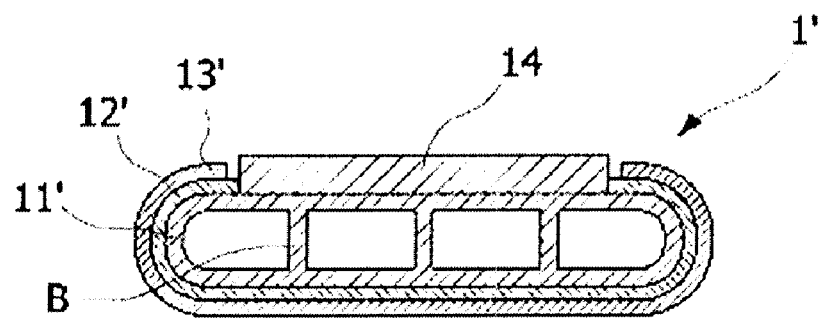
FIG. 1B is a cross sectional view illustrating an anode-supported flat tubular SOFC.
Figure 2A:
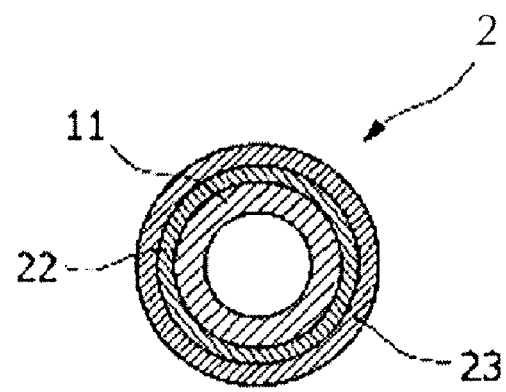
FIG. 2A is a cross sectional view illustrating an anode-supported cylindrical SOFC which is not provided with a connection member.
Figure 2B:
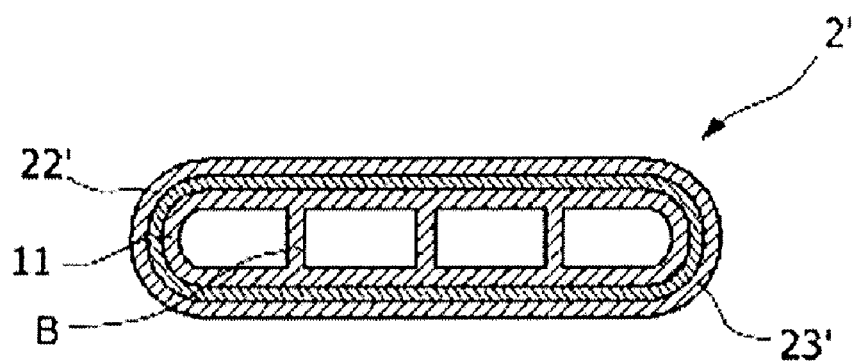
FIG. 2B is a cross sectional view illustrating an anode-supported flat tubular SOFC which is not provided with a connection member.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 3A:
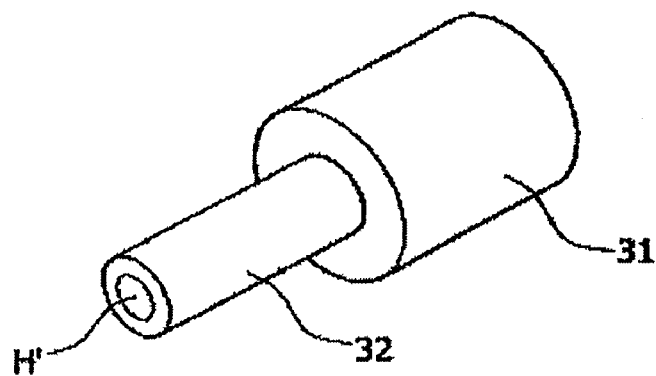
FIG. 3A is a perspective view illustrating a sealing element used for an anode-supported cylindrical SOFC, which is not provided with a connection member, according to a first embodiment of the present invention.
Figure 3B:
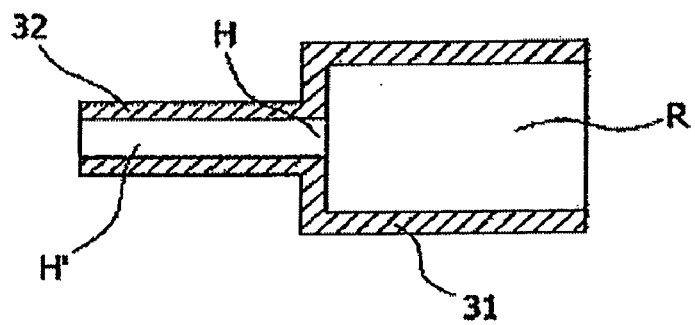
FIG. 3B is a longitudinal sectional view of a sealing element shown in FIG. 3A.
Figure 3C:
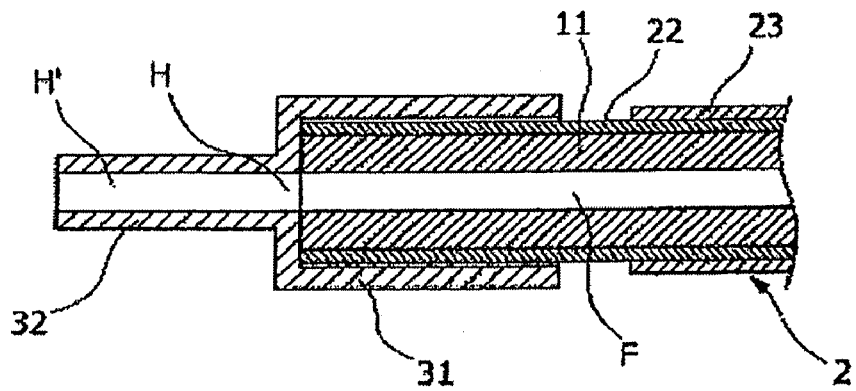
FIG. 3C is a longitudinal sectional view illustrating a coupling state between a fuel cell and a sealing element.
Figure 4A:
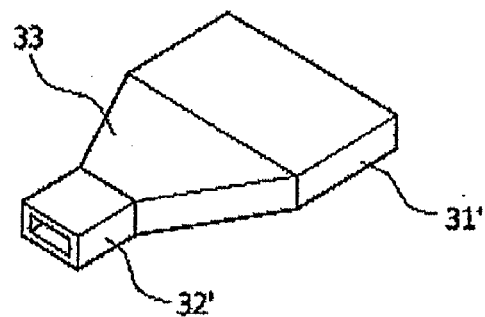
FIG. 4A is a perspective view illustrating a sealing element used for an anode-supported flat tubular SOFC, which is not provided with a connection member, according to a second embodiment of the present invention.
Figure 4B:
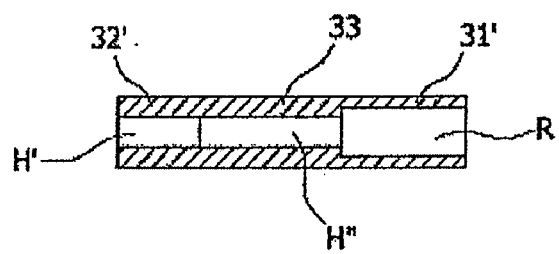
FIG. 4B is a front-sectional view of a sealing element shown in FIG. 4A.
Figure 4C:
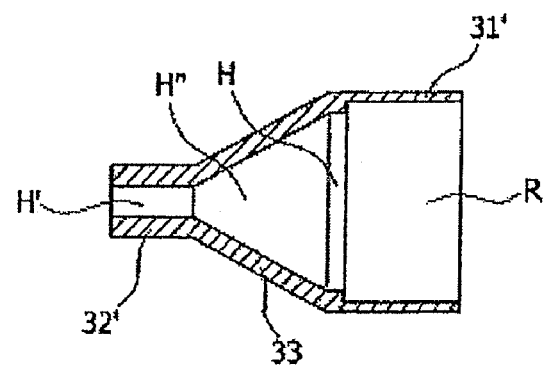
FIG. 4C is a plan-sectional view of a sealing element shown in FIG. 4A.
Figure 4D:
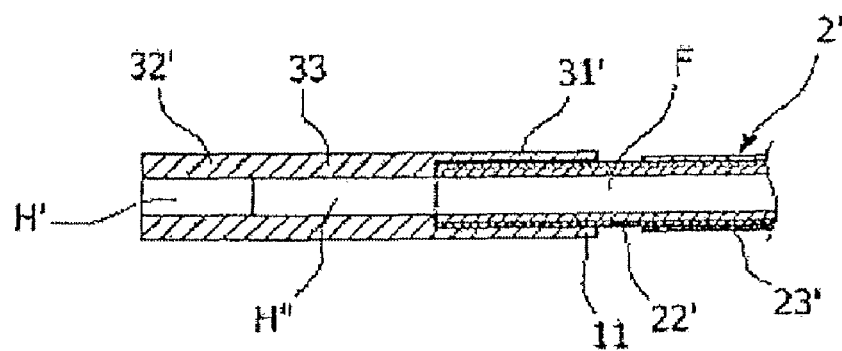
FIG. 4D is a front-sectional view illustrating a coupling state between a fuel cell and a sealing element shown in FIG. 4A.
Figure 4E:
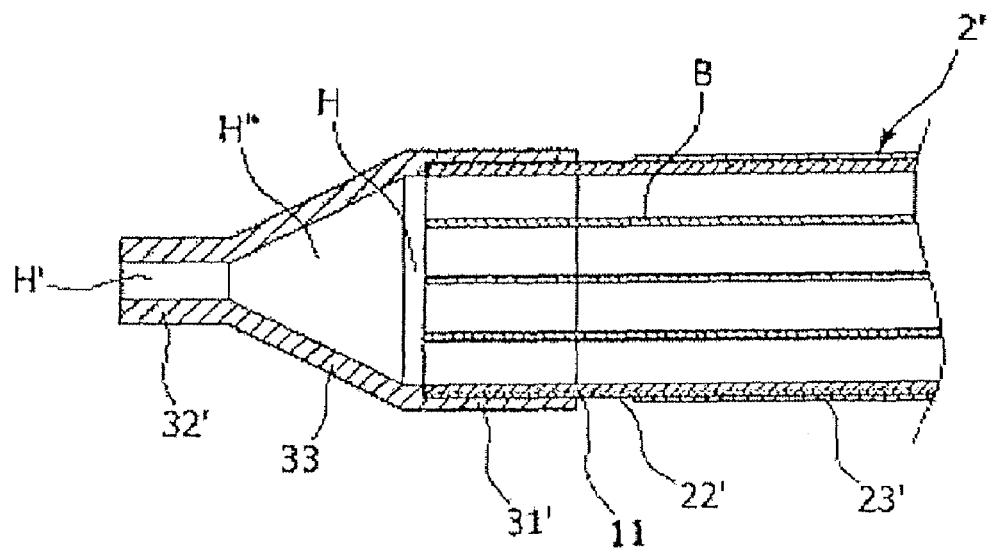
FIG. 4E is a plan-sectional view illustrating a coupling state between a fuel cell and a sealing element shown in FIG. 4A.

FIGS. 3A to 3C are perspective and sectional views illustrating an anode-supported cylindrical solid oxide fuel cell (SOFC), and FIGS. 4A to 4E are perspective and sectional views illustrating an anode-supported flat tubular SOFC.

As shown in FIGS. 3A to 4E, the present invention provides two types of sealing elements according to the shape of the tubular fuel cell inserted into the sealing element. When the sealing element is incorporated with a cylindrical fuel cell 2, the sealing element has a metallic cap structure and is coupled to both ends of the fuel cell 2. In this case, the sealing element includes a coupling tube 31 having a first end portion opened to an exterior such that the end portion of the fuel cell 2 can be inserted into the first end portion and a second end portion opened to the exterior only through a perforation hole H, which is formed at the center of the second end portion of the coupling tube 31 and has a sectional area equal to or smaller than that of a gas path F formed in the fuel cell 2, in which the coupling tube 31 is formed at an inner portion thereof with an internal cavity R having a shape corresponding to an external appearance of the end portion of the fuel cell inserted into the coupling tube 31; and a flow tube 32 extending outward from the center of the second end portion of the coupling tube 31 and being formed at an inner portion thereof with a hollow section H', which axially extends while communicating with the perforation hole of the coupling tube such that fuel gas can be fed or discharged through the hollow section H'.

In addition, when the sealing element is incorporated with a flat tubular fuel cell 2' where a plurality of bridges B are installed at an inner portion of the flat tubular fuel cell 2' and a plurality of gas paths F are axially formed in the flat tubular fuel cell 2' in parallel to each other, the sealing element includes a coupling tube 31' having a first end portion opened to an exterior such that an end portion of the fuel cell 2' can be inserted into the first end portion of the coupling tube 31' and a second end portion opened to the exterior only through a perforation hole H, which is formed at the center of the second end portion of the coupling tube 31' and has a sectional area equal to or smaller than a sectional area of an inner diameter portion of the fuel cell 2' including a bridge B, in which the coupling tube 31' is formed at an inner portion thereof with an internal cavity R having a shape corresponding to an external appearance of an end portion of the fuel cell 2' inserted into the coupling tube 31'; a connection tube 33 extending outward from the second end portion of the coupling tube 31' such that a sectional area of the connection tube 33 can be gradually reduced in an extending direction thereof and being formed at a center portion thereof with a connection hole H", which extends outward from the perforation hole H of the coupling tube 31' such that a sectional area of the connection hole H" can be gradually reduced in an extending direction thereof; and a flow tube 32' extending outward from a second end portion of the connection tube 33 and having a predetermined sectional area, wherein the flow tube 32' is formed at the inner center portion thereof with a hollow section H', which axially extends outward from the other end portion of the connection hole H" of the connection tube 33 and has a predetermined sectional area such that fuel gas can be fed or discharged through the hollow section H' of the flow tube 32'.

At this time, the sealing element of the present invention is securely coupled with the fuel cell 2 or 2' by means of brazing. Preferably, a sectional area of an inner diameter portion of the coupling tube 31 or 31' is equal to or larger than that of the end portion of the fuel cell 2 or 2' such that a gap is formed between the coupling tube 31 or 31' and the fuel cell 2 or 2' when the fuel cell has been inserted into the coupling tube. The gap is filled with filler materials while the brazing process is being performed with respect to the inner peripheral surface of the coupling tube 31 or 31' and the outer peripheral surface of the fuel cell 2 or 2'.

Figure 5A:
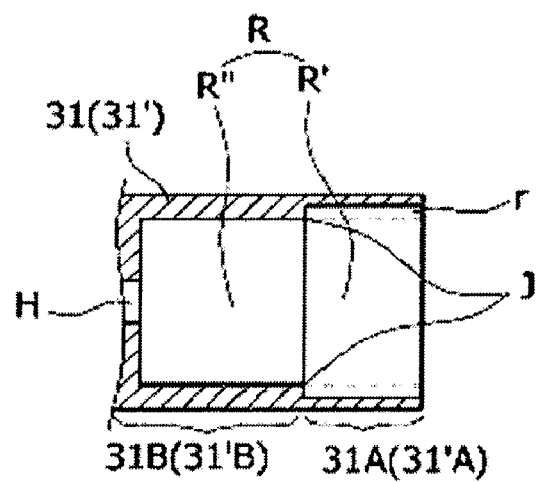
FIG. 5A is a longitudinal sectional view illustrating a sealing element used for an anode-supported cylindrical SOFC, which is not provided with a connection member, according to a third embodiment of the present invention.
Figure 5B:
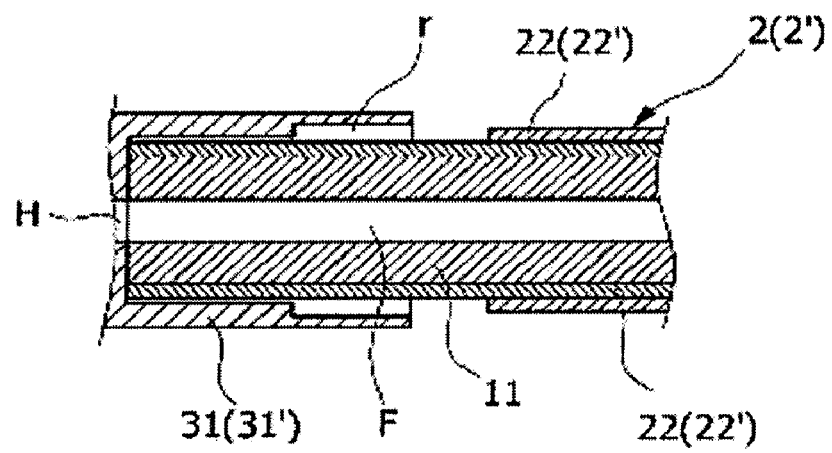
FIG. 5B is a plan-sectional view illustrating a sealing element used for an anode-supported flat tubular SOFC, which is not provided with a connection member, according to a fourth embodiment of the present invention.

More preferably, as shown in FIG. 5, the coupling tube 31 or 31' is divided into a front section 31A or 31'A adjacent to the first end portion of the coupling tube and a rear section 31B or 31'B adjacent to the flow tube. In this case, an internal cavity R' of the front section 31A or 31'A has a sectional area larger than that of an internal cavity R" of the rear section 31B or 31'B, so that a stepped portion J can be formed in the inner peripheral surface of the coupling tube 31 or 31'.

That is, in a state in which the fuel cell 2 or 2' has been inserted into the coupling tube 31 or 31' of the sealing element, a gap is not formed or only a tiny gap is formed between the inner peripheral surface of the rear section 31B or 31'B of the coupling tube 31 or 31' and the outer peripheral surface of the fuel cell 2 or 2' where the cathode is not provided. However, a predetermined gap (r) is formed between the inner peripheral surface of the front section 31A or 31'A of the coupling tube 31 or 31' and the outer peripheral surface of the fuel cell 2 or 2'. The metallic filler material is filled in the gap, thereby easily and perfectly sealing the fuel cell and the sealing element.

When the fuel cell is bonded to the sealing element through brazing after the fuel cell has been inserted into the sealing element having the above structure according to the present invention, the metallic filler material melted by heat flows into the gap formed between the inner peripheral surface of the coupling tube 31 or 31' and the outer peripheral surface of the fuel cell 2 or 2' due to a capillary phenomenon. At this time, the metallic filler material may be introduced into the inner portion of the fuel cell through the inner peripheral surface of the second end portion of the coupling tube 31 or 31' and the front portion of the fuel cell making contact with the inner peripheral surface of the second end portion of the coupling tube 31 or 31'. That is, the metallic filler material may flow into the gas path F of the fuel cell. If the metallic filler material is solidified in the gas path F of the fuel cell, it may interrupt the flow of fuel gas.

Figure 6A:
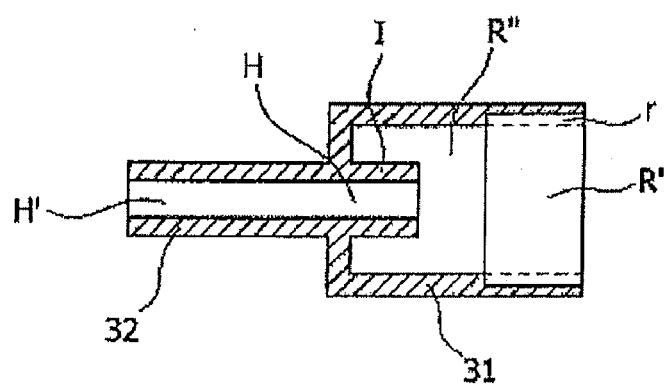
FIG. 6A is a longitudinal sectional view illustrating a sealing element used for an anode-supported cylindrical SOFC, which is not provided with a connection member, according to a fifth embodiment of the present invention.
Figure 6B:
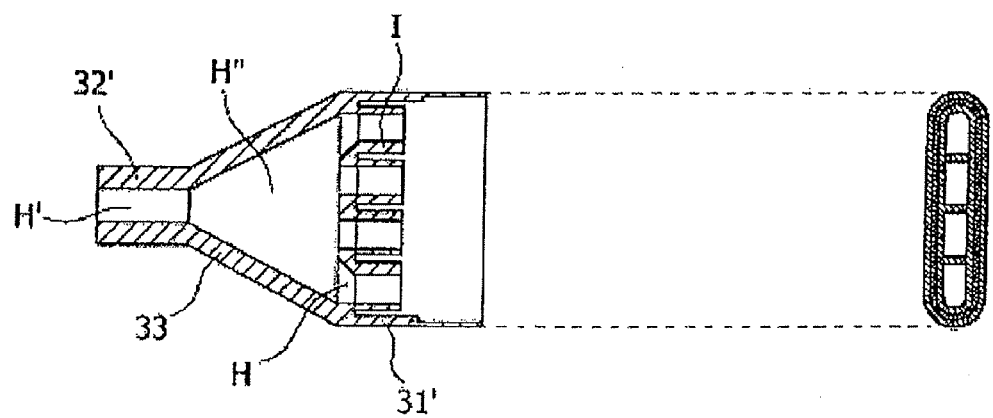
FIG. 6B is a plan-sectional view illustrating a sealing element used for an anode-supported flat tubular SOFC, which is not provided with a connection member, according to a sixth embodiment of the present invention.
Figure 7:
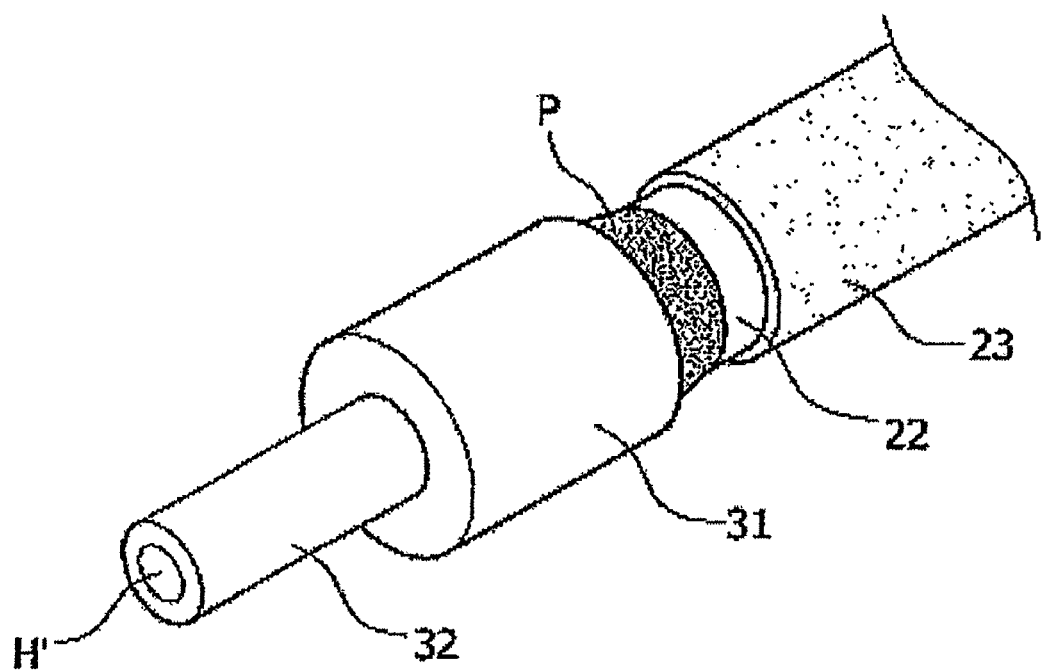
FIG. 7 is a perspective view illustrating a fuel cell coupled with a sealing element according to the fifth embodiment of the present invention by means of brazing.

Therefore, in order to prevent the above phenomenon, as shown in FIG. 6, at least one insertion tube I, which protrudes toward the first end portion of the coupling tube 31 or 31', is preferably provided at the second end portion of the coupling tube 31 or 31' such that the insertion tube I can be inserted into the gas path F of the fuel cell 2 and 2'.

That is, when the fuel cell 2 or 2' is inserted into the sealing element, the insertion tube I is inserted into the gas path F of the fuel cell 2 or 2', thereby preventing the gas path F from clogging by the metallic filler material P.

The present invention also provides a method for sealing both ends of the fuel cell after inserting the fuel cell into the sealing element having the above structure according to the present invention.

The method includes the steps of cleaning the sealing element and the fuel cell; surrounding an outer peripheral surface of an electrolyte layer formed on both ends of the fuel cell with a metallic filler material such that the electrolyte layer does not make contact with a cathode, inserting the fuel cell into a connection tube of the sealing element, and surrounding a boundary area between the sealing element and the fuel cell with the metallic filler material; and heating and melting the metallic filler material such that the melted metallic filler material can be filled in a gap formed between the sealing element and the fuel cell, and then solidifying the melted metallic filler material.

At this time, the cleaning step can be performed with various cleaning methods. For instance, the cleaning step for the sealing element made from a metallic material is performed using both acid and an acetone ultrasonic wave, and the cleaning step for the fuel cell can be performed using the acetone ultrasonic wave only. In addition, if a metal paste, rather than a metal sheet, is used as the metallic filler material, a drying step is added after coating the metal paste in order to remove moisture from the metal paste.

The heating step for the metallic filler material is performed in an inert gas atmosphere, a vacuum atmosphere, or a reducing atmosphere such that the sealing element can be prevented from being oxidized. For instance, the heating step for the metallic filler material is performed in the argon gas atmosphere or the argon and hydrogen gas atmosphere. Preferably, high frequency induction heating is employed in order to locally and rapidly heat the connection part formed between the sealing element and the fuel cell. When the heating step is performed in the argon and hydrogen gas atmosphere, it is preferred for safety to mix 20 volume % or less hydrogen gas with argon gas.

In addition, if the fuel cell has not yet been reduced before the brazing process, the fuel cell is subject to reduction heating at the temperature in a range of about 500 to 1000° C. in the argon and hydrogen gas atmosphere before the cleaning process is performed. The reason for performing the brazing process in the argon gas atmosphere or the argon and hydrogen gas atmosphere is that the metallic filler material can be easily melted and bonded without oxidizing Ni of a cermet anode support and the metallic filler material if the anode support has been reduced.

That is, in order to prevent the metallic filler material from being oxidized during the brazing process, the metallic filler material must be heated in the inert gas atmosphere, the vacuum atmosphere, or the reducing atmosphere. It is most preferred to perform the brazing process in the reducing atmosphere. When the metallic filler material is heated in the reducing atmosphere, the reduction heating and brazing processes are performed with respect to the fuel cell.

The sealing element according to the present invention used for sealing the fuel cell is made from a material including a ferrite iron alloy, a Ni alloy, Ni, an Fe—Ni alloy, or a ferrite stainless alloy. In addition, the metal paste includes one selected from the group consisting of a Ni alloy paste, an Ag alloy paste, an Ag—Cu alloy paste, and an Ag—Cu—Ti alloy paste. Table 1 shows components of a normal metal paste. In addition, Ni, Cu, Pd or Ag is preferably used as a metal sheet.

At this time, the sealing element and the metallic filler material must be properly selected on the basis of a heat expansion coefficient relative to the fuel cell and physical and chemical properties, such as erosion-resistance, etc.

TABLE 1

| Material | Composition | Liquidus line(° C.) | Solidus line(° C.) |
|---|---|---|---|
| $^a$BNi-2 (Nicrobraz LM-S) | 0.06 wt % max. C, 3.0 wt % Fe, 4.5 wt % Si, 3.1 wt % B, 7.0 wt % Cr, and Ni | 1010 | 990 |
| $^a$BNi-5 (Nicrobraz 30-S) | 0.06 wt % max. C, 10.2 wt % Si, 19.0 wt % Cr, and Ni | 1135 | 1080 |
| $^b$Nicusil-8 | 42.0 wt % Cu, 2.0 wt % Ni, and Ag | 893 | 771 |
| $^b$Palcusil-10 | 31.5 wt % Cu, 10.0 wt % Pd, and Ag | 852 | 805 |

* $^a$Wesgo Inc., Belmont, Ca
* $^b$Wallcolmonoy Co.

The fuel cell inserted into the sealing element can be fabricated through the steps of preparing a metal paste by mixing NiO with 8 mol % $Y_2O_3$-stabilized $ZrO_2$ in such a manner that 40 volume % Ni can be contained in the metal paste, extruding the metal paste in the form of anode-supported tube, and pseudo-sintering the anode-supported tube at the temperature of about 1100 to 1300° C.; and coating $Y_2O_3$-stabilized $ZrO_2$ having a thickness of several tens of μm or less on an entire outer peripheral surface of the anode-supported tube through a vacuum slurry coating, sintering the anode-supported tube at the temperature of about 1400° C., thereby forming an electrolyte layer, slurry coating a cathode on an outer peripheral surface of the electrolyte layer, except for both end portions of the electrolyte layer, and sintering the electrolyte layer at the temperature of about 1200° C.

That is, the both ends of the fuel cell have a dual stack structure including the anode and the electrolyte layer and the center portion of the fuel cell has a triple stack structure including the anode, the electrode and the cathode. In this state, the fuel cell is coupled with the sealing element through brazing. At this time, the cathode may not make contact with the sealing element or the metal paste, so that it is possible to collect electric charges through the sealing element and the cathode exposed to the exterior.

As described above, according to the sealing element and the sealing method of the present invention, each end portion of the fuel cell can be simply and perfectly sealed by means of the sealing element, and the bonding section between the fuel cell and the sealing element represents superior mechanical strength and tightness as well as superior resistance against thermal shock in the high-temperature environment or temperature-variable environment, so that the endurance and performance of the fuel cell can be improved.

In addition, since it is possible to obtain superior electrical conductive characteristics by directly bonding the metal sealing element to the anode support, the sealing element can be used as an anode collector. In this case, the sealing element can collect current through a metal manifold, so that the fuel cell stack can be fabricated with a simple structure.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A sealing element for sealing both ends of an anode-supported tubular solid oxide fuel cell, the sealing element comprising:

a coupling tube having a first end portion opened to an exterior and a second end portion opened to the exterior only through a perforation hole, which is formed at a center of the second end portion of the coupling tube and has a sectional area equal to or smaller than a sectional area of a gas path formed in the fuel cell, in which the coupling tube is formed at an inner portion thereof with an internal cavity having a shape corresponding to an external appearance of an end portion of the fuel cell inserted into the coupling tube; and a flow tube extending outward from the center of the second end portion of the coupling tube and being formed at an inner portion thereof with a hollow section, which axially extends while communicating with the perforation hole of the coupling tube.

2. The sealing element as claimed in claim 1, wherein the coupling tube includes a front section having a larger sectional area and a rear section having a smaller sectional area and a stepped portion is formed at a boundary area between the front section and the rear section.

3. The sealing element as claimed in claim 1, wherein the coupling tube is provided at the second end portion thereof an insertion tube, which protrudes toward the first end portion of the coupling tube so as to be inserted into the gas path of the fuel cell.

4. A sealing element for sealing both ends of an anode-supported tubular solid oxide fuel cell, the sealing element comprising:

a coupling tube having a first end portion opened to an exterior and a second end portion opened to the exterior only through a perforation hole, which is formed at a center of the second end portion of the coupling tube and has a sectional area equal to or smaller than a sectional area of an inner diameter portion of the fuel cell including a bridge, in which the coupling tube is formed at an inner portion thereof with an internal cavity having a shape corresponding to an external appearance of an end portion of the fuel cell inserted into the coupling tube;

a connection tube extending outward from the second end portion of the coupling tube such that a sectional area of the connection tube can be gradually reduced in an extending direction thereof and being formed at a center portion thereof with a connection hole, which extends outward from the perforation hole of the coupling tube such that a sectional area of the connection hole can be gradually reduced in an extending direction thereof; and a flow tube extending outward from a second end portion of the connection tube and having a predetermined sectional area, wherein the flow tube is formed at an inner center portion thereof with a hollow section, which axially extends outward from the other end portion of the connection hole of the connection tube and has a predetermined sectional area.

5. The sealing element as claimed in claim 4, wherein the coupling tube includes a front section having a larger sectional area and a rear section having a smaller sectional area and a stepped portion is formed at a boundary area between the front section and the rear section.

6. The sealing element as claimed in claim 4, wherein the coupling tube is provided at the second end portion thereof a plurality of insertion tubes, which protrude toward the first end portion of the coupling tube so as to be inserted into the gas path of the fuel cell.

7. A method for sealing both ends of an anode-supported tubular solid oxide fuel cell, the method comprising the steps of:

cleaning a sealing element and a fuel cell claimed in claim 1 or 4;

surrounding an outer peripheral surface of an electrolyte layer formed on both ends of the fuel cell with a metallic filler material such that the electrolyte layer does not make contact with a cathode, inserting the fuel cell into a connection tube of the sealing element, and surrounding a boundary area between the sealing element and the fuel cell with the metallic filler material, or coating a metallic paste filler material on the outer peripheral surface of the electrolyte layer formed on both ends of the fuel cell, inserting the fuel cell into the connection tube of the sealing element, coating the metallic paste filler material on the boundary area between the sealing element and the fuel cell, and drying the metallic paste filler material to remove moisture from the metallic paste filler material; and heating and melting the metallic filler material in an inert gas atmosphere, a vacuum atmosphere, or a reducing atmosphere such that the melted metallic filler material is filled in a gap formed between the sealing element and the fuel cell, and then solidifying the melted metallic filler material.

8. The method as claimed in claim 7, wherein the metallic filler material includes one selected from the group consisting of Ni, Cu, Pd and Ag.

9. The method as claimed in claim 7, wherein the cleaning step for the sealing element and the fuel cell includes the substeps of cleaning the sealing element using acid and an acetone ultrasonic wave, and cleaning the fuel cell using the acetone ultrasonic wave.

* * * * *